United States Patent [19]

Stoll

[11] Patent Number: 4,760,236
[45] Date of Patent: Jul. 26, 1988

[54] METHOD AND A SUPPORT FIXTURE FOR THE MANUFACTURE OF BELLOWS CONSISTING OF ANNULAR ELEMENTS

[76] Inventor: Kurt Stoll, Lenzhalde 72, 7300 Esslingen, Fed. Rep. of Germany

[21] Appl. No.: 931,740

[22] Filed: Nov. 17, 1986

[30] Foreign Application Priority Data

Nov. 26, 1985 [DE] Fed. Rep. of Germany ....... 3541655
Feb. 14, 1986 [DE] Fed. Rep. of Germany ....... 3604677

[51] Int. Cl.$^4$ .............................................. B23K 26/00
[52] U.S. Cl. .................. 219/121.63; 29/454; 219/121.64; 219/121.82; 219/121.13; 219/121.14
[58] Field of Search ................ 219/121 EC, 121 ED, 219/121 LC, 121 LD, 121 LY; 228/44.3, 49.1, 212, 184; 29/227, 454; 265/87.3; 254/10.5

[56] References Cited

U.S. PATENT DOCUMENTS

| | | | |
|---|---|---|---|
| 1,836,634 | 12/1931 | Urfer | 29/454 X |
| 3,100,256 | 8/1963 | Borg | 29/454 |
| 3,538,670 | 11/1970 | Morgan | 29/454 X |
| 3,918,622 | 11/1975 | Larsen | 29/454 X |
| 3,949,186 | 4/1976 | Makayama et al. | 215/121 LD X |
| 4,001,543 | 1/1977 | Bove et al. | 219/121 L |
| 4,272,665 | 6/1981 | Steigerwald | 219/121 LD X |
| 4,496,097 | 1/1985 | Larsen | 29/454 X |
| 4,513,194 | 4/1985 | Mastromatteo | 219/121 EC |

*Primary Examiner*—C. L. Albritton
*Attorney, Agent, or Firm*—McGlew and Tuttle

[57] ABSTRACT

A method of manufacturing bellows members composed of stacks of annular elements which are joined together by weld seams produced alternately at inner and outer edges of the elements. In the invention at least some of the annular elements of a bellows member are mounted on a rotating fixture for welding the seams by a beam welder. During the production on one such seam the beam welding device is held stationary in relation to the elements.

17 Claims, 6 Drawing Sheets

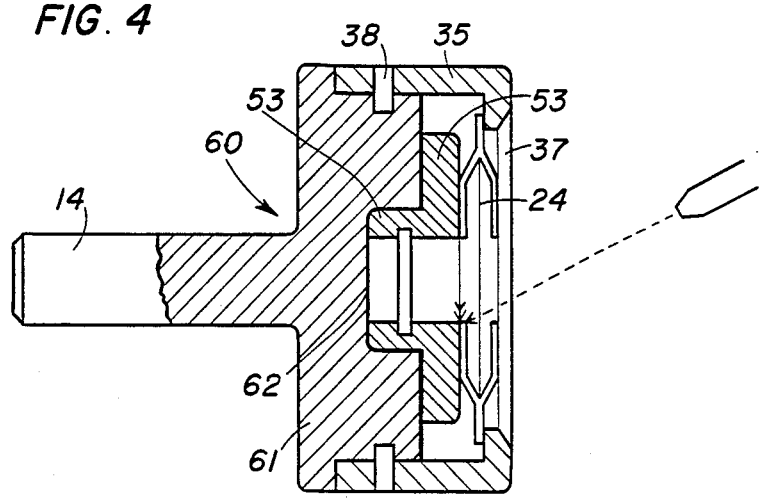

METHOD AND A SUPPORT FIXTURE FOR THE MANUFACTURE OF BELLOWS CONSISTING OF ANNULAR ELEMENTS

BACKGROUND OF THE INVENTION

The invention relates to a method for the production of bellows members from elastically deforming annular elements which are alternately united with each other at inner and outer peripheries. The invention also relates to a support fixture for use in the manufacture of the bellow members.

Such bellows members may be for example used as protective boots in all applications in which a moving element is to be sealed off from the surroundings, as for instance in connection with cylinder actuators. In the prior art there have been proposals to unite the individual annular elements by soldering, brazing, adhesive bonding or resistance welding. However complex methods are needed for practicing such processes in order to ensure the necessary high quality of the joins. The heating of the annular elements which is necessary in all methods with the exception of adhesive bonding is a disadvantage in connection with many materials. In the case of soldering, brazing and bonding the molten metal or the adhesive is inclined to run so that no neat and regular join may be produced. This is more especially true in the case of the internal joins which it is hardly possible inspect during welding.

OVERVIEW OF THE INVENTION

Consequently one object of the present invention is to devise a method of the initially mentioned kind making it possible for bellows members consisting of annular elements to be simply produced.

A further aim of the invention is to manufacture such bellows members with a high degree of accuracy.

In order to achieve these or other objects appearing during the course of the present specification, at least some of the annular elements, which are for instance made of a corrosion-resistant material such as, more especially, stainless steel, are held together by a rotating support fixture and are welded during one rotation of the support fixture by a beam welding device and for producing successive following annular weldments on the annular elements there is a relative linear or tilting displacement on the part of the beam welding device in steps or if the beam welding device is stationary, the support fixture is moved in steps.

This novel method makes it possible for the annular elements to be aligned in a stack with a high degree of precision and since beam welding only involves local heating, there is no danger of any displacement or distortion of this arrangement, i.e. the alignment is precisely kept to. Rotation of the fixture makes it possible for the external and internal annular weld seams to be produced by a stationary welding device.

Further advantageous developments of, and improvements in the invention will be seen from the claims.

It is an advantage if in the first working steps during manufacture two respectively outwardly convex annular elements are welded together at their circumferences, whereafter the bellows elements so formed are placed in line and then welded together in a further working step. This makes possible a very rapid and rational method of production.

It has been found to be advantageous if during the production of the inner weldments the outer sides of the bellows elements or bellows units are subjected to vacuum so that the parts to be united by welding are pressed against each other and no gaps are left or formed.

In order to produce the outer weldments between the bellows elements it is preferred to use a support fixture with a mandril for supporting the annular elements and with a first fixed annular abutment, which cooperates with a detachable member, forming a second abutment, slipped onto the mandril and locked thereon to hold two annular elements between it and the first said abutment, this making it possible to weld the peripheral parts of two annular elements, it being an advantage if the abutments are formed on to circular discs having the dish-like side faces of the two annular elements abutting them. The outwardly convex side faces of the two annular elements then engage radial internal faces of the abutments so that the annular elements are very firmly secured for being welded at their peripheries that are pressed together and radially proud of the first and second abutments. If a quick release coupling is used for securing the detachable member on the mandril it is then possible to rapidly replace the parts to be welded.

For producing the internal weld seams it is convenient to employ a different supporting fixture, whose element supporting member and/or a detachable member joined therewith define a cylindrical cavity receiving and locating the members that are to be welded. The detachable member having an axial welding opening to the one end of it to provide access of the oblique welding beam to the points at which welding is to take place. In this case as well the members that are to be welded are securely located during welding and by rotation of the supporting fixture they may be welded without changing the direction of the beam. A simple way of effecting such rotation is to join the end part at one end with a driving shaft. The shaft may be held in a chuck or other coupling means of driving unit not forming part of the invention.

For the manufacture of longer bellows structures by the welding together of bellows units or bellows elements, the support fixture in the form of a tube may have an axially sliding internal abutment part, shutting off the tube, for variation of the tube length. The tube may then be conveniently adapted to the respective length of the members to be welded.

If a suction duct in the supporting member is used to exhaust the outer peripheral part of the cavity so as to be at a lower pressure than the pressure inside the members which are to be welded, there is the advantageous effect of pressing together the members to be welded so that it will not be possible for any gaps to be left in the welded seams and the seams may be more precisely executed.

In this case it is convenient if the inner zone of the members to be welded is sealed off from the outer zone by annular seals.

In order to be able to weld connection means or terminators on to the two ends of a bellows member, the end face defined by the supporting the latter may conveniently have a corresponding recess which is also provided with an annular seal and/or a ring or broad contact seal, i.e. one in a form guaranteeing sealing contact over a large area, on its inner end face. The opposite bellows connection means is advantageously retained in position in the axial welding opening and engaged by the annular seal provided here in any case at the periphery.

To make possible rapid mounting of the members to be welded and to rapidly place the members to be attached by welding in alignment, it is convenient to connect the detachable member with the supporting member using a quick release joint such as a bayonet coupling in which respect the coupling member for example may have a tubular extension fitting over the supporting member and on which the quick release fastener may be placed.

Working examples of supporting fixtures in accordance with the invention are to be seen in the accompanying drawings and will now be described in what follows together with the novel welding method.

LIST OF THE SEVERAL VIEWS OF THE DRAWINGS

FIG. 4 shows a further working example of a supporting fixture for the production of internal weld seams at a joint between a bellows terminator and a bellows element.

DETAILED ACCOUNT OF EMBODIMENTS OF THE INVENTION

Figure 1:
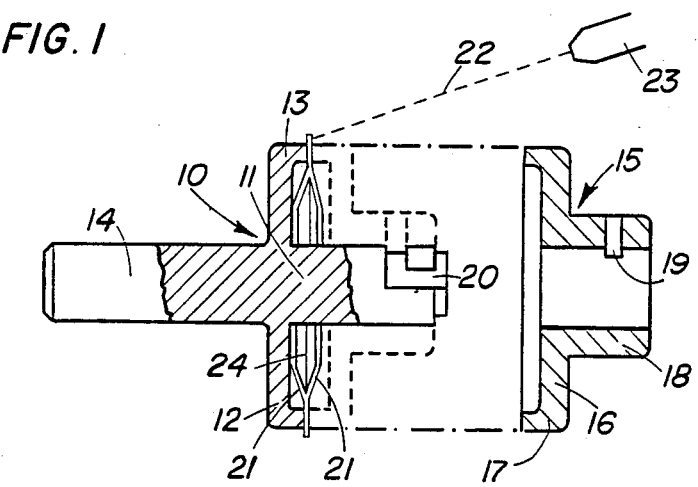
FIG. 1 shows a working example of supporting fixture for the production of the external weld seams on bellows elements.

The embodiment of the invention shown in FIG. 1 comprises a support member 10 in the form of a circular disk 12 mounted concentrically on a circularly cylindrical mandril 11 so as to be perpendicular to its axis. The circular disk 12 has an annular abutment 13. On the side of the circular disk 12 opposite to the mandril 11 there is an drive shaft 14 connected with the disk. The members 11 through 14 are integrally joined together. A detachable member 15 is in the form of a suitably shaped circular disk 16 with an annular abutment 17 which is concentric with a tubular guide part 18 joined to the opposite side of the circular disk 16. The inner diameter of a concentric hole in the circular disk 16 is equal to the inner diameter of the guide part 18 and to the diameter of the mandril 11 so that the guide part 18 may be slipped onto the mandril 11. Together with a generally L-like slot 20 in the mandril 11 a catch 19, which extends into the cavity inside the guide part 18, forms a bayonet coupling.

For the manufacture of bellows elements two round dish-like annular elements with their outer peripheries touching are slipped onto the mandril 11. The diameter of the inner openings of the annular elements 21 is equal to the diameter of the mandril 11. The abutment 13 is slightly smaller in diameter than the outer periphery, resting against the abutment 13, of an annular element 21 which projects outwardly in a radial direction and at the same time the abutment 13 engages the curved inner part of an annular element 21 on the circular disk 12. Whenever the detachable member 15 is slipped onto the mandril 11 and secured with the aid of the bayonet coupling 19 and 20 the two outer peripheries of the annular elements 21 will be pressed into firm engagement by means of the two abutments 13 and 17.

The driving shaft 14 is connected by way of a coupling (not illustrated) with a drive unit by which the supporting fixture is caused to revolve. A laser beam 22 from a laser welder 23, which is only shown diagrammatically, is obliquely directed onto the proud peripheries of the two annular elements 21 and owing the rotation of the supporting fixture an external weld seam is produced connecting the two annular elements 21 with each other.

After release of the detachable member 15, the finished bellows element 24 consisting of the welded annular elements may now be taken from the device so that two further annular elements may be put in its place and welded together.

Figure 2:
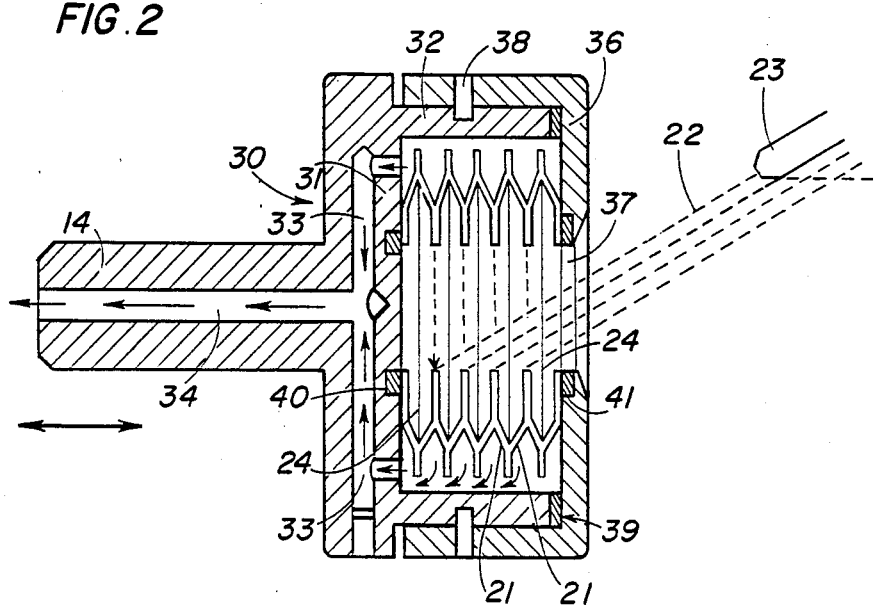
FIG. 2 shows an embodiment of a supporting fixture for the production of internal weld seams on a certain number of bellows elements constituting a bellows unit.

In the embodiment of the invention shown in FIG. 2 a support member 30 is in the form of a tube 32 which is closed at one end by an end wall 31. The driving shaft 14 is concentrically connected with this end wall 31. The internal diameter of the tube 32 is such that bellows elements 24 are radially located in the tube. The length of the tube is such that for example five bellows elements 24 may be accommodated therein. The number of bellows elements may obviously be varied as desired.

There are two suction ducts 33 extending from the peripherally outer part of the tube cavity and which are continued through the end wall 31 in a radially inward direction and join with a suction duct 34 in the drive shaft 14 which leads to a vacuum pump that is not illustrated.

A tubular detachable member 35 surrounding the tube 32 has an end wall 36 which has a concentric welding beam opening 37. The detachable member 35 may be connected by way of a bayonet coupling 38 with the tube 32 so that it surrounds it. Then the tubular part of the detachable part 35 is received on a part of the supporting member 30 with a reduced diameter.

For sealing off the zone within the bellows elements 24 from the zone outside, the end face of the tube 32 has an annular seal 39 which makes hermetic contact with the detachable member 35 secured by the bayonet coupling 38. Furthermore the end walls 31 and 36 have annular seals 40 and 41 on their inner sides, whose diameter is slightly greater than the diameter of the annular holes in the bellows elements 24 so that the dished or convex outer faces of the two outer bellows elements make hermetic contact with these annular seals 40 and 41.

For the welding operation five prefabricated bellows elements 24 are slipped into the support member 30 and then the detachable member 35 is placed on it and secured. Then air is drawn off through the suction ducts 33 and 34 in the peripheral part of the tube 32 so that the inner peripheries of the bellows elements are pressed against each other. After this the complete support fixture is caused to rotate by the drive shaft 14. The four internal weld seams are then sequentially produced with the laser welder 23; as soon as one weld seam is finished the support fixture 14 or the laser welder 23 is moved axially through a distance equal to the axial length of a bellows element 24. This is denoted by the four laser beams 22 shown parallel to each other and by the double arrow parallel to the drive shaft 14.

The laser beam 22 is projected at an oblique angle so that it may pass through the welding opening 37 and readily reach the intended points of welding. The bellows elements welded together in this manner, for example in a stack of five, are in what follows referred to as bellows units 42.

Figure 3:
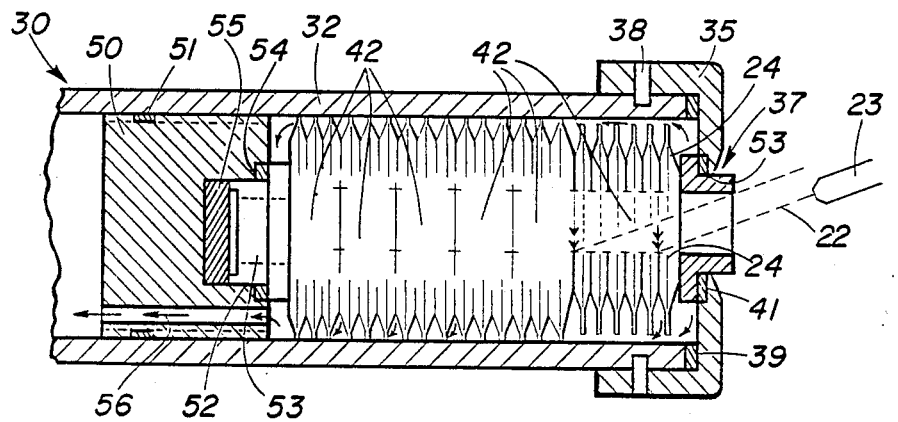
FIG. 3 shows a working example of a supporting fixture for the production of internal weld seams for the connection of a bellows unit with a further bellows unit or bellows elements.

The supporting fixture shown in the working example of FIG. 3 serves for the welding together of such bellows units 42 and/or for welding bellows units to bellows elements 24. To make this possible the tube 32 is made substantially longer than in the embodiment of the invention shown in FIG. 2 and it has an internal axially sliding abutment member 50 whose peripheral annular seal 51 hermetically engages the bore of the tube 32. This annular seal 51 also makes it possible to set the force which is needed for sliding the abutment member 50 and is necessary to perform the function of an abutment. In addition it is possible to have a different locking means for the abutment member 50.

The detachable member 35 is the same as the detachable member illustrated in FIG. 2. The driving shaft 14 (as in FIG. 2) connected with the end wall 31 may also serve as a termination of the tube 32 as in FIG. 3. It would obviously be possible for the tube 32 to serve itself as a drive shaft.

The abutment member 50 has a concentric recess 52 in its inner side facing the detachable member 35 in order to receive a bellows termination 53 or connector. This recess 52 has an annular seal 54 on its inner periphery and on its radial face it has a broad contact seal 55, i.e. one guaranteeing sealing contact over a large area as opposed to a ring. However the design might be simplified so that there would only be one of these two seals. A suction duct 56 connects the peripherally outer part of the cavity in the tube with the tube cavity on the other side of the abutment member 50.

The supporting fixture shown in FIG. 3 is suitable for welding together different numbers of bellows units 42 and/or bellows elements 24, since the abutment member 50 is adjustable in the axial direction and may be used to secure arrays to be welded with different designs. In the case illustrated a sixth bellows unit 42 and a single bellows element 24 are to be welded to five bellows units 42 extending in a row from the abutment member 50 that have already been welded together. A bellows termination 53 has already been welded to the bellows element 24. A bellows termination 53 as shown in the right extends through the welding opening 37 to the outside and the annular seal 41 on the inneri edge of the welding opening 37 makes a hermetic joint between the detachable member 35 and the bellows termination 53.

The further embodiment of a supporting fixture illustrated in FIG. 4 serves to weld a bellows termination 53 to a bellows element 24. A supporting member 60 consists of a thick end wall 61 connected to the driving shaft 14. This wall 61 has a recess 62 to receive a bellows termination 53. The bellows element 24 is urged against this termination 53 by way of the detachable member already described with reference to FIGS. 2 and 3. The welding opening 37 is somewhat larger than that provided in the earlier embodiments of the invention and its periphery engages the outer periphery of the bellows element 24. It is naturally possible for this welding opening 37 to be as in the earlier embodiments. The suction ducts and the seals may also be as in the earlier embodiments and for the sake of simplicity they are not included in FIG. 4.

As a modification of the working examples so far shown and described, it is possible for the bayonet coupling shown to be replaced by other quick release couplings or by attachment flanges. Furthermore, in place of the laser beam welder 23 it would be possible to have another beam welding device, as for instance an electron beam welder. In this case it would naturally enough be necessary for the welding operations to take place in evacuated chambers.

It is furthermore to be noted that the method of the invention may conveniently be applied for the production of bellows members which are corrosion resistant and consist for example of stainless steel. This is more specifically an advantage when such bellows members are used in chemical plant.

Figure 5:
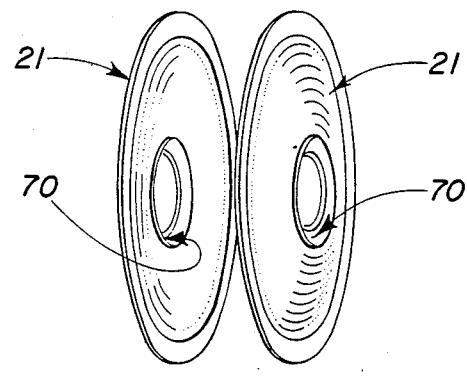
FIG. 5 illustrates the annular elements in the form of round dish-like elements or washers with conically formed internal welding areas, i.e. welding rims at their inner peripheries.

FIG. 5 shows two dish-like annular elements 21 with the inner concave sides turned towards each other. Two annular inner areas, which serve as welding areas 70 for the production of annular weld seams to connect the annular elements 21 together, are conical and are so arranged that an outwardly bent part of the annular element on the left is directed to the outside and on the right hand element is directed inwards. The concave outer side is referred to as "outside".

Figure 6A:
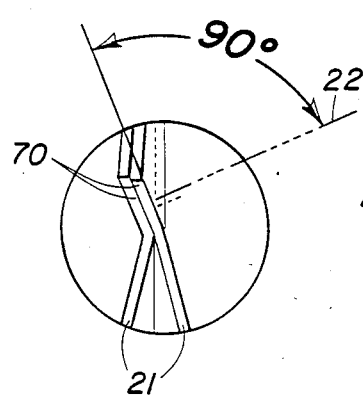
FIG. 6a is a view on a large scale of two welding areas placed in abutting engagement.
Figure 6B:
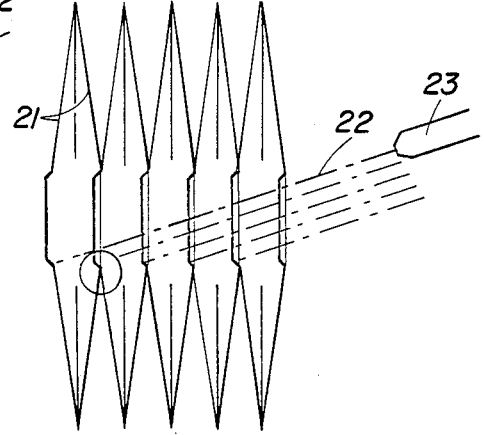
FIG. 6b is an array of ten annular elements 21.

FIG. 6 illustrated an array of ten annular elements 21 aligned in a row with these two possible configurations of element arranged alternately so that in this way when two concave outer sides are in contact two conically formed welding surfaces are parallel and adjacent to each other. This is shown on a larger scale in a circular view on a larger scale as part of FIG. 6. The angle of the conical outwardly formed part is so selected that the welding beam which is directed inwards at an oblique angle to the bellows elements is incident on the welding faces 70 at a right angle.

In this manner it is on the one hand possible to achieve a maximum concentration of the welding energy and on the other dispersal of the beam is prevented; the welding beam may no longer be deflected by the surrounding areas.

It is naturally also possible to design the peripheral welding areas so as to have such a slope that the welding beams is incident on them at a right angle. This is shown in more detail in FIGS. 5 and 6.

I claim:

1. A method for the production of a hollow bellows member formed of elastically deformable ring elements each element having an inner periphery and an outer periphery, the ring elements being fixable together along ring seams formed on the outside periphery and the inside periphery of each of the rings, bellows end elements being fixable on an end face of the connected deformable ring elements, the method comprising the steps of: positioning at least one pair of ring elements in a first supporting fixture, the supporting fixture about an axis so the outer periphery of one of the ring elements abuts the outer periphery of another ring element, the elements being positioned concentrically about the axis with the inner peripheries of two such elements substantially parallel to each other to form an adjacent ring pair; rotating the first supporting fixture and simultaneously directing a welding beam onto the outer periphery of the adjacent ring pair to produce a weld seam connecting the ring elements to form a bellows element; subsequently positioning at least two bellows elements in a second supporting fixture the second supporting fixture having an axis of rotation, the bellows elements being concentrically about the axis of rotation of the second supporting fixture, one inner periphery of each of the two bellows elements being parallel to a corresponding adjacent other inner periphery of one of two bellows elements; rotating the supporting fixture and simultaneously directing a welding beam onto the adjacent inner periphery of the bellows elements to form a bellows unit; positioning the bellows unit and a bellows end element in a third rotatably mounted supporting fixture so as to position an inner periphery of the bellow unit adjacent the bellow end element; rotating the third supporting fixture and simultaneously directing a welding beam onto the inner periphery of the bellow unit and adjacent end element; and, prior to said step of positioning at least one pair of ring elements, forming an annular surface on the inner and outer periphery of the ring elements, the surface being formed at a right angle to the direction of the welding beam when the ring element is positioned, the bellows elements are positioned, and bellows unit is positioned.

2. A method according to claim 1, wherein: the welding beam is directed onto a weld point obliquely to the plane of the ring elements to be welded.

3. The method according to claim 1 further comprising: creating a vacuum during the welding of the inner periphery of the bellow elements and the bellow units, the vacuum being created on an outer side of the bellow elements and the bellow units.

4. A method according to claim 1 wherein, the bellows is formed as a pneumatic cylinder formed of individual resilient ring elements, each of the individual resilient ring elements being formed of stainless steel.

5. A welding apparatus for welding a circular seam to connect ring elements having an inner periphery and an outer periphery comprising: a first supporting fixture including a mandril for receiving the ring elements so as to support the ring elements at the inner periphery of the ring elements, an annular stop connected to the mandril, a fixable closure part engagable with the mandril, the annular stop being connected to the mandril by a circular disk adapted to abut a side face of a ring element, a counter-stop being connected to the closure part by a circular disk adapted to abut a side face of ring element, the closure part being fixable on a mandril by means of a bayonet closure.

6. An apparatus according to claim 5 further comprising: a second supporting fixture formed as a tube and having a closed end face; and a third supporting fixture.

7. An apparatus according to claim 6, wherein the enclosed end face is provided with a drive shaft.

8. An apparatus according to claim 6, wherein said second supporting fixture includes a stop positioned within the tube, the stop being axially displaceable and fixable so as to allow the length of the tube to be varied.

9. An apparatus according to claim 6, further comprising a vacuum channel extending through the second supporting fixture discharging in a circumferential region of a cavity defined by the tube.

10. An apparatus according to claim 9, wherein the closed end face includes at least one radial vacuum channel connected to the circumferential discharge.

11. An apparatus according to claim 10, wherein: said stop member includes a circumferential vacuum channel in vacuum connection with said circumferential discharge.

12. An apparatus according to claim 9, further comprising: sealing means for sealing the inner region of parts to be welded from the outer region of parts to be welded.

13. An apparatus according to claim 6, wherein: an end face of each of the second and the third supporting structure includes a cutout portion for receiving a bellow end element.

14. An apparatus according to claim 13, wherein: each of the end face cutouts having a seal provided at the inner end face of the cutout.

15. An apparatus according to claim 6, wherein: the closure part of the second supporting figure is connected to the second supporting fixture by a bayonet closure.

16. An apparatus according to claim 6, wherein: the closure part of the third supporting figure is connected to the third supporting fixture by a bayonet closure.

17. A method for the production of a hollow bellows member formed of elastically deformable ring elements each element having an inner periphery and an outer periphery, the ring elements being fixable together along ring seams formed on the outside periphery and the inside periphery of each of the rings, bellows end elements being fixable on an end face of the connected deformable ring elements, the method comprising the steps of: positioning at least one pair of ring elements in a first supporting fixture, the supporting fixture being rotatable about an axis so the outer periphery of one of the ring elements abuts the outer periphery of another ring element, the elements being positioned concentrically about the axis with the inner peripheries of two such elements substantially parallel to each other to form an adjacent ring pair; rotating the first supporting fixture and simultaneously directing a welding laser beam onto the outer periphery of the adjacent ring pair to produce a weld seam connecting the ring elements to form a bellows element; subsequently positioning at least two bellows elements in a second supporting fixture, the second supporting fixture having an axis of rotation, the bellows elements being concentrically about the axis of rotation of the second supporting fixture, one inner periphery of each of the two bellows elements being parallel to a corresponding adjacent other inner periphery of one of two bellows elements; rotating the supporting fixture and simultaneously directing a welding beam onto the adjacent inner periphery of the bellows elements to form a bellows unit; positioning the bellows unit and a bellows end element in a third rotatably mounted supporting fixture so as to position an inner periphery of the bellow unit adjacent the bellow end element; rotating the third supporting fixture and simultaneously directing a welding laser beam onto the inner periphery of the bellows unit and adjacent end element; and, prior to said step of positioning at least one pair of ring elements, forming an annular surface on the inner and outer periphery of the ring elements, the surface being formed at a right angle to the direction of the welding laser beam when the ring element is positioned, the bellow elements are positioned, and bellow unit is positioned.

* * * * *